United States Patent Office 3,552,189
Patented Jan. 5, 1971

3,552,189
APPARATUS FOR DETECTING SCALE FORMATION
Pierre Courvoisier, Grenoble, Emile Muratore, Egreve, Andre Roche, Clermont Ferrand, and Paul Vignet, Grenoble, France, assignors to Commissariat a l'Energie Atomique, Paris, France
Filed July 10, 1969, Ser. No. 840,655
Claims priority, application France, July 26, 1968, 160,692
Int. Cl. G01n 17/00
U.S. Cl. 73—61.2                                  10 Claims

ABSTRACT OF THE DISCLOSURE

Apparatus to detect danger of scale formation on a surface for the transfer of heat between a scale-forming fluid and a fluid in the form of vapor even before any deposit has begun to form has a duct for the circulation of scale-forming fluid which has been withdrawn from the heat-transfer system to be monitored. There is a monitoring tube in the duct with means for maintaining said tube at a temperature which is slightly higher than that of the heat-transfer surface, and means for detecting the formation of a deposit on the wall of said tube. The heating means may be a circulation system in which vapor withdrawn from the heat-transfer system is brought into contact with the internal wall of the monitoring tube.

---

The formation of scale on heat transfer surfaces of boilers or like systems is always highly objectionable since it is liable to impair the efficiency of these devices to a marked degree.

Scale formation is to be expected in particular when the heat transfer surfaces are in contact with certain fluids and especially sea water. The formation of salt deposits is one of the most important problems which arise in the construction of plants for the desalination of sea water by the distillation process, in which the sea water has to be heated to the boiling point or to a temperature close to the boiling point by means of a secondary fluid such as low-pressure steam.

In fact, the deposits which are formed increase at such a high rate that, when a drop in efficiency is observed as a result of such deposits, it is already too late to modify the conditions of operation of the plant (temperature, concentration factor, hydrodynamic parameters). It is therefore necessary to stop production in order to carry out either chemical or mechanical cleaning of the surfaces.

The aim of the present invention is to overcome these disadvantages by providing an apparatus which makes it possible to detect any danger of formation of a deposit before this latter has even begun to form within the apparatus or plant to be monitored. It is thus possible to carry out the necessary adjustment and to modify the operating conditions in such a manner as to prevent any scale formation.

This invention is in fact directed to an apparatus for detecting scale formation on a surface for heat transfer between a scale-forming fluid and a fluid in the form of vapor. Said apparatus essentially comprises a duct for the circulation of scale-forming fluid which is withdrawn from the heat-transfer system to be monitored, a monitoring tube which is coaxial with said duct and fitted with means for heating and maintaining the surface temperature of said monitoring tube at a value which is slightly higher than that of the heat-transfer surface to be monitored and devices for detecting the formation of a deposit on the wall of the monitoring tube.

In accordance with another property of the invention, the surface of the monitoring tube which is located opposite to the duct for the circulation of scale-forming fluid is heated by condensation of vapor withdrawn from the heat exchange circuit between the vapor and the scale-forming fluid.

In accordance with another property, the heated surface of the monitoring tube is provided with a water-repellent coating which increases the condensation exchange coefficient and consequently the temperature of the tube wall.

In a preferred form of construction, the apparatus comprises two tubes having different lengths in coaxial relation with the monitoring tube which have their openings at proximity of the tube wall which is located opposite to the duct and which are joined at the lower end one to a vapor source and the other to a collector of non-condensed vapor, a pipe for connecting the monitoring tube to a condensate collector being provided at the lower end of said tube.

The apparatus as thus constituted operates under slightly more unfavorable conditions than the system to be monitored inasmuch as the temperature of the monitoring tube is maintained at a value which is slightly higher than that of said system whilst the scale-forming fluid is withdrawn from the same system so that a deposit will accordingly appear in this apparatus before it begins to form in the system to be monitored.

Formation of a deposit can be checked by any suitable method, by simple observation or preferably by measurement either of the heat flow through the wall of the monitoring tube, or of the temperature of said tube wall, or of the pressure drop within the duct through which the scale-forming fluid is circulated.

Irrespective of the means employed, the purpose of the detection method is to provide a warning prior to commencement of formation of any deposit in the plant.

A number of other properties and advantages of the invention will in any case become apparent from the following description of one embodiment which is given by way of non-limitative example and illustrated in the accompanying drawings, in which.

Figure 1:
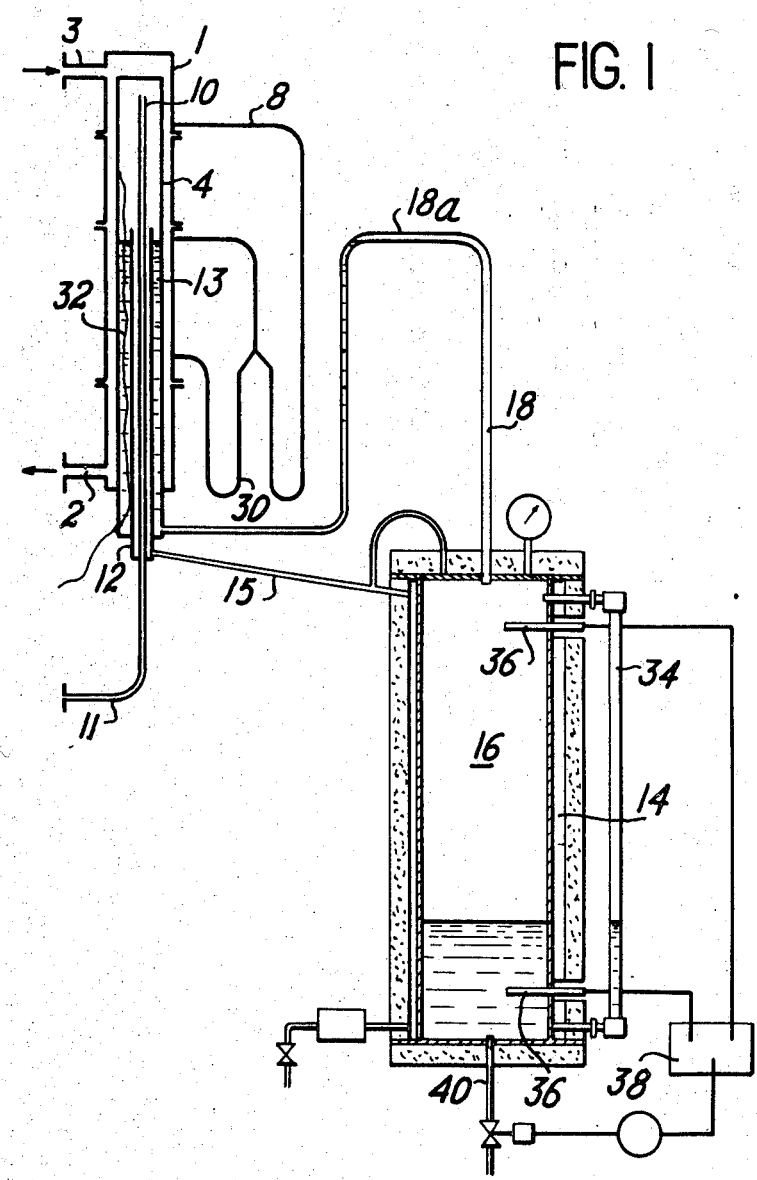
FIG. 1 shows diagrammatically an apparatus for detecting scale formation in accordance with the invention.

In the description which now follows, it will be assumed that the apparatus of the invention is employed in a plant for the desalination of sea water by the flash distillation process and that it is placed at the outlet of the heater.

However, it is wholly apparent that this apparatus could be employed in any other installation and could also be placed at another point even in a plant for the desalination of sea water by distillation. For example, in the case of a plant for multiple-effect distillation by evaporation, the apparatus could be placed at several points at the outlet of the evaporators.

Irrespective of the position and level at which it is employed, said apparatus comprises essentially a duct 1 provided with openings 2 and 3 respectively for the admission and discharge of the scale-forming fluid, namely brine in the case of a plant for the desalination of sea water. Said opeings 2 and 3 are connected by means of pipes (not shown) to the heater system.

There is placed within the interior of said duct 1 a monitoring tube 4 which is coaxial with this latter and within which are disposed heating means, said means being controlled in dependence on the temperature which prevails within the heater so as to maintain the tube 4 at a temperature which is slightly higher than the maximum temperature of the surface of the heater tubes. As a consequence, the wall of the tube 4 which is preferably formed of the same alloy as the heat-transfer surface to be protected is maintained under operating conditions which are more unfavorable than those which prevail in the heater and a deposit accordingly forms in said tube before it begins to form in the installation.

The heating means can be of any known type. For example, it would be possible to make use of electric heating, heating by means of an auxiliary heat-transport fluid, or heating by vapor condensation using either steam or organic vapor.

In the embodiment which is illustrated, the heating is carried out by condensation of vapor which is withdrawn at the heater outlet. The heating means which are placed within the interior of the tube 4 are preferably constituted in this case by a plurality of tubes 10, 12 which are coaxial with the duct 1 and open into the interior of this latter at different levels. The inner tube 10 has its opening practically at the top of said duct 1 whilst the lower end of said tube is connected at 11 to the heater itself so as to form a vapor supply tube. On the other hand, the tube 12 opens into the tube 4 at a level which is distinctly lower and the lower end of this tube is connected by way of a pipe 15 to an annular chamber 14 which is placed at the periphery of a reservoir 16, said reservoir being connected by way of an elbowed tube 18 to the lower end of the tube 4.

Figure 2:
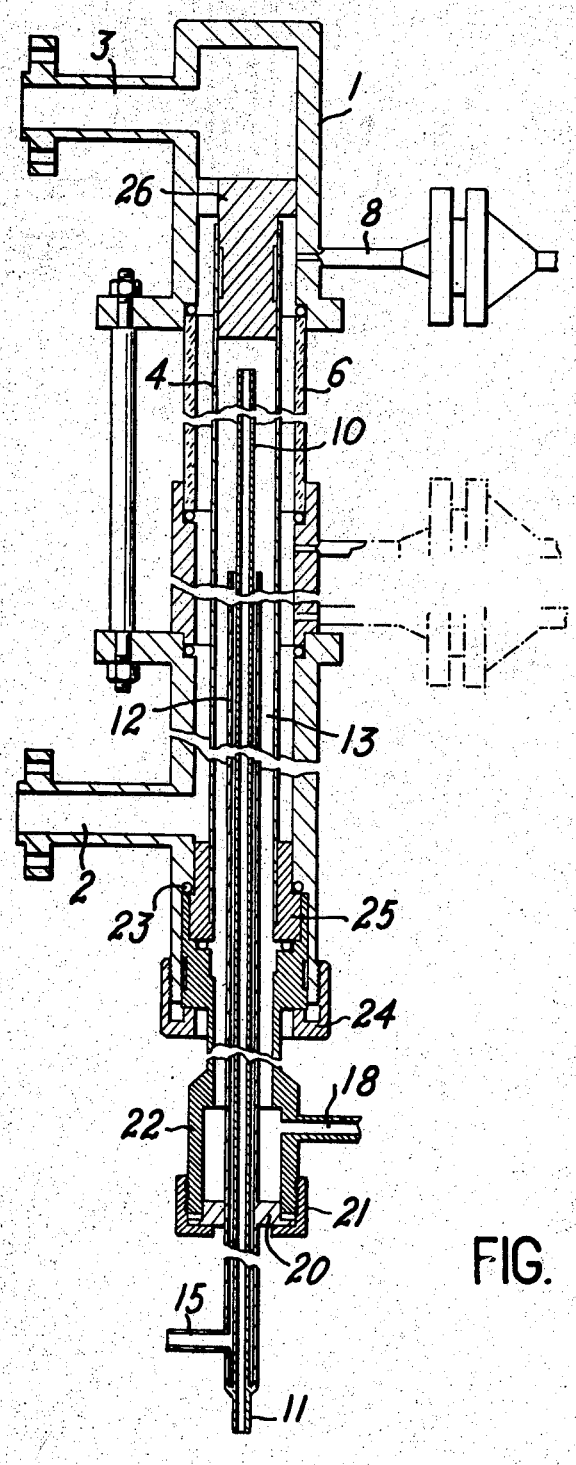
FIG. 2 shows on a larger scale and in longitudinal cross-section the arrangement of the monitoring tube and of the heating means.

As shown in FIG. 2, the tubes 10 and 12 are rigidly fixed to the tube 4 at the outer extremities thereof and are supported by a plug 20 which is held in position by means of a nut 21 and this latter closes an end-piece 22 which forms an extension of the tube 4 and into which opens the pipe 18. Said end-piece 22 is in turn maintained in close contact with the tube 4 which is supported by this latter by means of a nut 24 which is screwed onto a terminal threaded portion of the duct 1. O-ring seals 23 serve to maintain leak-tightness between the tube 4 and the duct 1 whilst a ring 25 which is tightly applied against said seals serves to center said tube. A plug 26 provided with external fins closes the other end of the tube 4 and centers this latter within the duct 1.

The vapor which is admitted through the tube 10 is brought into contact with the upper wall of the tube 4 and tends to condense thereon. The condensate thus formed is guided by said wall towards the space 13 which is provided between the tubes 12 and 4 and then towards the tube 18 which leads to the reservoir 16. The loop which is formed by the elbowed portion 18a of said tube 18 extends upwards to a level which is close to that of the top opening of the tube 12 and forms a level-regulating overflow tube whereby the condensate is maintained at a constant level within the space 13.

The non-condensed vapor, the particles which may be carried by this latter and the non-condensable gases are discharged via the tube 15 towards the peripheral chamber 14 and transmit their heat to the reservoir as a whole.

Said reservoir is maintained at a pressure which is equal to that of the incoming vapor and is thus maintained at a temperature which is very close to the temperature of the tube 4.

Since the vapor which heats the monitoring tube 4 also passes through the heater, the temperature of said tube 4 is at least equal to that of said heater and follows all the fluctuations of this latter.

However, in order to maintain the wall of the monitoring tube at a temperature which is slightly higher than that of the hottest wall of the heater, said tube is provided with an internal coating of a water-repellent substance which improves the condensation exchange coefficient, which consequently promotes condensation and which increases the temperature of the tube wall. The coating referred to can be a gold plating, for example, having a thickness of five microns. The coefficient of condensation can then be improved by a value of approximately 40% whilst the conditions of flow of the brine remain the same.

The presence of a deposit on the wall of the tube 4 can be detected in different ways, for example by simple viewing through an inspection window 6 which is formed in a portion of the duct 1 and made of a transparent material which constitutes a part of the wall of the duct 1 (FIG. 2).

The formation of a deposit can also be indicated by a variation in one of the parameters on which it acts, for example by an increase in pressure drop within the duct 1 through which the scaling fluid flows, said increase being indicated by a differential manometer 30 connected to pressure taps 8 which are placed preferably in the duct 1 at the normal level of the condensate and respectively at two points located on each side of said level and at an equal distance from this latter along the height of said duct 1.

If necessary, a flow meter (not shown) can be placed in the vapor supply pipe 10. Thus, a measurement of the flow of condensate makes it possible to define the percentage of excess vapor which varies at the time of formation of scale.

In other designs, the formation of scale can be indicated by means of variations in heat flow through the wall of the tube 4; thus, a deposit causes a reduction in the heat flow, that is to say an increase in the wall temperature or a reduction in condensation.

The temperature of the wall of the tube 4 can readily be controlled by means of thermocouples 32 which are attached to the wall of the tube above the normal level of the condensate and which pass through the lower portion of said tube.

Since the level of condensate within the space 13 is constant, a variation in the flow of condensate results in a variation in level within the reservoir 16. A gauge glass 34 is fixed outside the reservoir 16, is parallel to the axis of this latter and connected to the bottom and top portions of said reservoir. It is possible by this means and at each moment to check the level of condensate within said reservoir or in other words to determine the rate of flow of the condensate.

In addition, said reservoir 16 can be fitted with conductivity candles 36 which are preferably placed so that one candle is located at the lower end of the reservoir and the other is located at the upper end, said candles being connected to an electrovalve 38 which controls a discharge orifice 40 pierced at the bottom of the reservoir 16. When the condensate comes into contact with the candles, the discharge orifice is opened and a count of the number of control pulses of the electrovalve serves to measure the flow of condensed water and to know the variations in said flow.

Whatever measuring means are employed, it is therefore possible to obtain a warning as soon as scale has begun to form on the wall of the monitoring tube. In fact, since the operating conditions of this tube are more unfavorable than those which prevail in the heater, said warning corresponds to the threshold of formation of the deposit within the installation. Steps can immediately be taken to modify operating conditions even before any scale formation has started.

It will be apparent that warning systems such as visual indicators, signal lamps or the like can be provided for the purpose of indicating the detection of the threshold of scale formation.

What we claim is:

1. An apparatus for detecting scale formation on a surface for heat transfer between a scale-forming fluid and a fluid in the form of vapor comprising a duct for the circulation of scale-forming fluid withdrawn from the heat-transfer system to be monitored, a monitoring tube in and coaxial with said duct means for heating and maintaining the surface temperature of said monitoring tube slightly higher than that of the heat-transfer surface to be monitored and means for detecting the formation of a deposit on the wall of the monitoring tube, the surface of the monitoring tube in the duct for the circulation of scale-forming fluid being heated by condensation of vapor withdrawn from the heat exchange circuit between the vapor and the scale-forming fluid.

2. An apparatus in accordance with claim 1, the heated surface of the monitoring tube having a water-repellent coating which increases the condensation exchange coefficient and the temperature of the tube well.

3. An apparatus in accordance with claim 1, including two tubes having different lengths in coaxial relation with the monitoring tube, openings in said tubes adjacent the tube wall opposite to the duct, the lower end of one of said tubes being connected to a vapor source and the lower end of the other of said tubes being connected to a vapor collector, and a pipe connecting the monitoring tube to a condensate collector at the lower end of said tube.

4. An apparatus in accordance with claim 3, including an elbowed overflow pipe opening at the lower end of the monitoring tube regulating the level of the condensate and opening in a reservoir for the collection of condensates and means for maintaining said reservoir at the pressure of the incoming vapor.

5. An apparatus in accordance with claim 4, including a vapor outlet connected to a peripheral annular chamber for heating the condensate reservoir.

6. An apparatus in accordance with claim 1, including a plurality of pressure taps in the duct for the circulation of scale-forming fluid connected to a differential manometer for measuring the pressure drop along the monitoring tube.

7. An apparatus in accordance with claim 1, the duct wall located opposite to that portion of the monitoring tube located above the normal level of the condensate is transparent forming an inspection window.

8. An apparatus in accordance with claim 1, including thermocouples for the continuous measurement of the temperature of the tube, said thermocouples being sensitive to the increase in temperature which results from scale formation.

9. An apparatus in accordance with claim 1, including means for measuring the heat flow which passes through a given surface of the monitoring tube, said surface being a gauge glass mounted outside the reservoir for the collection of said condensate.

10. An apparatus in accordance with claim 9, said means for measuring the heat flow includes conductivity candles mounted at a number of points on the condensate reservoir, an electrovalve for controlling a discharge orifice in dependence on said candles and elements for measuring the number of control pulses of said electrovalve.

References Cited
UNITED STATES PATENTS

| | | | |
|---|---|---|---|
| 2,404,474 | 7/1946 | Collins | 73—61.3X |
| 3,141,324 | 7/1964 | Boies et al. | 73—61.2 |

LOUIS R. PRINCE, Primary Examiner

J. W. ROSKOS, Assistant Examiner